United States Patent Office 3,795,691
Patented Mar. 5, 1974

3,795,691
CHOLESTEROL-LOWERING AGENTS
George H. Douglas, Paoli, and Charles J. Guinosso, Philadelphia, Pa., assignors to American Home Products Corporation, New York, N.Y.
No Drawing. Filed June 23, 1971, Ser. No. 156,136
Int. Cl. A61k 27/00; C07c 143/68
U.S. Cl. 260—456 P
7 Claims

ABSTRACT OF THE DISCLOSURE

This invention is concerned with novel cholesterol reducing agents which have the general formula:

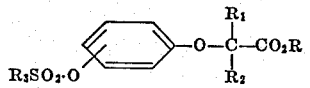

wherein R is (lower)alkyl; $R_1$ and $R_2$ are selected from the group consisting of hydrogen and (lower)alkyl or taken together may form a cycloalkyl group; $R_3$ is aryl or substituted aryl or (lower)alkyl and with intermediates for their production.

DESCRIPTION OF THE INVENTION

The invention is concerned with compounds of Formula I and Formula II:

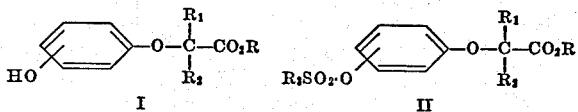

wherein R is (lower)alkyl; $R_1$ and $R_2$ are selected from the group consisting of hydrogen and (lower)alkyl or taken together may form a cycloalkyl group; $R_3$ is selected from the group consisting of phenyl, halophenyl, dihalophenyl, (lower)alkylphenyl and (lower)alkyl.

Compounds of Formula I are intermediates for production of pharmacologically active compounds of Formula II.

The compounds of the invention may be prepared by the procedure set forth in the following flow sheet:

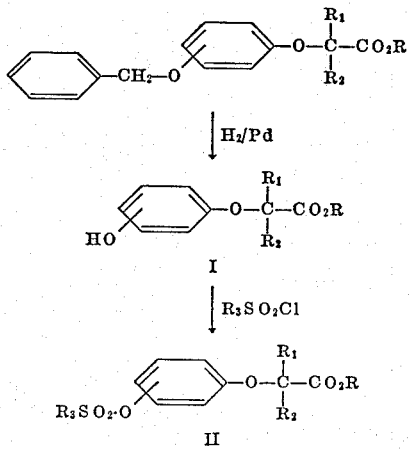

wherein R, $R_1$, $R_2$ and $R_3$ are the same as hereinabove defined.

The generation of the intermediate hydroxyphenoxy compound is achieved by catalytic hydrogenation of the corresponding benzyl ether. The catalyst employed was 10% palladium on charcoal but other standard catalysts may be employed.

Esterification of the resulting phenol was effected in the usual manner using an acid chloride and pyridine.

The preferred compounds of the invention are those wherein $R_1$ and $R_2$ are methyl and R is ethyl.

The antilipemic activity of the compound is determined by the following procedure:

Male weanling rats are fed a hypercholesterolemic diet for three weeks. Serum cholesterol is determined on 0.01 ml. of serum separated from tail blood collected in a capillary tube. Groups of rats with equal average serum cholesterol are given the test compound orally once a day by syringe for three days. Serum cholesterol is determined in the morning of the fourth day. Antilipemic activity is demonstrated by a lowering of the serum cholesterol.

Compounds of the invention were found to be active in reducing serum cholesterol at a dosage of 50 mg. once daily p.o.

As used herein the term (lower)alkyl is used to include hydrocarbon radicals containing from 1 to about 6 carbon atoms such as methyl, ethyl, n-propyl, i-propyl, n-pentyl and the like. The terms halo and halogen are used to include chloro, fluoro, iodo and bromo. The term cycloalkyl is used to denote cycloaliphatic radicals containing from about five to about seven carbon atoms.

EXAMPLE I

Ethyl 4-hydroxyphenoxyisobutyrate

Ethyl 4-benzyloxyphenoxyisobutyrate 1.57 g. was shaken in an atmosphere of hydrogen at atmospheric pressure with 10% Pd/C (0.14 g.) in ethanol (20 ml.) until hydrogen uptake ceased (145 ml.). The catalyst was filtered off and the solvent evaporated, and the product crystallized from hexane to give the title compound 0.94 g. (84%), M.P. 84–86°.

IR 2.7 and 5.6 µ

Analysis (later sample) found (percent): C, 64.19; H, 7.21. $C_{12}H_{11}O_2$ requires (percent): C, 64.27; H, 7.19.

EXAMPLE II 2-(p-hydroxyphenoxy)-2-methylpropionic acid, ethyl ester, p-iodobenzenesulfonate Ethyl-4-hydroxyphenoxyisobutyrate (4.48 g.) was stirred in pyridine (15 ml.) at 5° C. p-Iodobenzene sulfonyl chloride (6.6 g.) was added and the mix. stirred for 72 hours.

Water and ether were added, and the organic extract washed with 5% HCl, 5% NaOH, $NaHCO_3$ and brine, then dried ($Na_2SO_4$). Evaporation and crystallization of the residue gave the title comp. 6.5 g., M.P. 67–70°. Found (percent): C, 44.41; H, 4.02; S, 6.61; I, 26.02. $C_{18}H_{19}SIO_6$ requires (percent): C, 44.1; H, 3.87; S, 6.54; I, 25.90.

EXAMPLE III 2-(p-hydroxyphenoxy)-2-methylpropionic acid, ethyl ester, p-bromophenylsulfonate Ethyl-4-hydroxyphenoxyisobutyrate was stirred in pyridine at 5° C. Then p-bromobenzene sulfonyl chloride was added and the mixture stirred for 72 hours. Water and ether were added, and the organic extract washed with 5% HCl, 5% NaOH, NaHCO$_3$ and brine, then dried (Na$_2$SO$_4$). Evaporation and crystallization of the residue gave the title compound. M.P. 52–54° C. Found (percent): C, 48.91; H, 4.37; S, 8.08; Br, 18.33. C$_{18}$H$_{19}$BrO$_6$S requires (percent): C, 48.79; H, 4.29; S, 7.24; Br, 18.05.

EXAMPLE IV 2-(p-hydroxyphenoxy)-2-methylpropionic acid, ethyl ester, p-chlorophenylsulfonate Ethyl-4-hydroxyphenoxyisobutyrate was stirred in pyridine at 5° C. Then p-chlorobenzene sulfonyl chloride was added and the mixture stirred for 72 hours. Water and ether were added, and the organic extract washed with 5% HCl, 5% NaOH, NaHCO$_3$ and brine, then dried (Na$_2$SO$_4$). Evaporation and crystallization gave the title compound. M.P. 51–53° C. Found (percent): C, 54.10; H, 4.78; S, 7.90; Cl, 8.62. C$_{18}$H$_{19}$ClO$_6$S requires (percent): C, 54.2; H, 4.76; S, 8.04; Cl, 8.9.

EXAMPLE V 2-p-hydroxyphenoxy)-2-methylpropionic acid, ethyl ester, p-toluenesulfonate Ethyl-4-hydroxyphenoxyisobutyrate was stirred in pyridine at 5° C. Then p-toluene sulfonyl chloride was added and the mixture stirred for 72 hours. Water and ether were added, and the organic extract washed with 5% HCl, 5% NaOH, NaHCO$_3$ and brine, then dried (Na$_2$SO$_4$). Evaporation and crystallization of the residue gave the title compound. M.P. 69° C. Found (percent): C, 60.26; H, 5.86; S, 8.49. C$_{19}$H$_{22}$O$_6$S requires (percent): C, 60.30; H, 5.82; S, 8.49.

EXAMPLE VI 2-(p-hydroxyphenoxy)-2-methylpropionic acid, ethyl ester, 2,5-dichlorobenzenesulfonate Ethyl-4-hydroxyphenoxyisobutyrate was stirred in pyridine at 5° C. Then 2,5-dichlorobenzene sulfonyl chloride was added and the mixture stirred for 72 hours. Water and ether were added, and the organic extract washed with 5% HCl, 5% NaOH, NaHCO$_3$ and brine, then dried (Na$_2$SO$_4$). Evaporation and crystallization of the residue gave the title compound. M.P. 54–58° C. Found (percent): C, 49.87; H, 4.27; Cl, 16.41; S, 7.36. C$_{18}$H$_{18}$Cl$_2$SO$_6$ requires (percent): C, 49.9; H, 4.16; Cl, 16.4; S, 7.40.

EXAMPLE VII 2-(p-hydroxyphenoxy)-2-methylpropionic acid, ethyl ester, methanesulfonate Ethyl-4-hydroxyphenoxyisobutyrate was stirred in pyridine at 5° C. Then methyl sulfonyl chloride was added and the mixture stirred for 72 hours. Water and ether were added, and the organic extract washed with 5% HCl, 5% NaOH, NaHCO$_3$ and brine, then dried (Na$_2$SO$_4$). Evaporation and crystallization of the residue gave the title compound. M.P. 41° C. Found (percent): C, 51.79; H, 6.06; S, 10.61. C$_{13}$H$_{18}$O$_6$S requires (percent): C, 51.78; H, 5.96; S, 10.61.

EXAMPLE VIII

By analogous methods, the following compounds are prepared:

| R$_3$ | R$_1$ | R$_2$ | R |
|---|---|---|---|
| Methyl | Ethyl | Ethyl | Methyl. |
| p-Ethylphenyl | Methyl | Methyl | Ethyl. |
| 2,5-dibromophenyl | Hydrogen | Hydrogen | n-Propyl. |
| Ethyl | n-Propyl | n-Propyl | Ethyl. |
| n-Propyl | Methyl | Methyl | Do. |

| R$_3$ | R$_1$ R$_2$ | R: |
|---|---|---|
| p-Chlorophenyl | Cyclohexyl | Ethyl. |
| Phenyl | Cyclopentyl | Methyl. |
| o-Chlorophenyl | Cycloheptyl | Ethyl. |

We claim:
1. A compound of the formula:

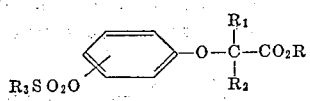

wherein

R is (lower)alkyl;

R$_1$ and R$_2$ are members independently selected from the group consisting of hydrogen and (lower)alkyl, and when taken together, R$_1$ and R$_2$ form with the carbon atom to which they are attached, a cycloalkyl group containing from about 5 to about 7 carbon atoms;

R$_3$ is a member selected from the group consisting of phenyl, halophenyl, dihalophenyl, (lower)alkyl phenyl and (lower)alkyl radicals.

2. A compound as defined in claim 1 which is 2-(p-hydroxyphenoxy)-2-methylpropionic acid, ethyl ester, p-iodobenzenesulfonate.

3. A compound as defined in claim 1 which is 2-(p-hydroxyphenoxy) - 2 - methylpropionic acid, ethyl ester, p-bromophenylsulfonate.

4. A compound as defined in claim 1 which is 2-(p-hydroxyphenoxy)-2-methylpropionic acid, ethyl ester, p-chlorophenylsulfonate.

5. A compound as defined in claim 1 which is 2-(p-hydroxyphenoxy)-2-methylpropionic acid, ethyl ester, p-toluenesulfonate.

6. A compound as defined in claim 1 which is 2-(p-hydroxyphenoxy)-2-methylpropionic acid, ethyl ester, 2,5-dichlorobenzenesulfonate.

7. A compound as defined in claim 1 which is 2-(p-hydroxyphenoxy)-2-methylpropionic acid, ethyl ester, methanesulfonate.

References Cited
UNITED STATES PATENTS

| 3,462,473 | 8/1969 | Nelson et al. | 260—456 P |
| 2,567,839 | 9/1951 | Britton et al. | 260—456 P |
| 2,734,069 | 2/1956 | Masuda | 260—456 P |
| 3,622,610 | 11/1971 | Hausermann et al. | 260—456 P |

JOSEPH E. EVANS, Primary Examiner

U.S. Cl. X.R.

260—473 A; 424—303, 308